United States Patent Office 3,350,365
Patented Oct. 31, 1967

3,350,365
PROCESS FOR POLYMERIZING N-CARBOXY-α-AMINO ACID ANHYDRIDES
Ryoichi Wakasa, Shinichi Ishida, and Junichi Takeda, Tokyo, Japan, assignors to Asahi Kasei Kogyo Kabushiki Kaisha, Osaka, Japan, a corporation of Japan
No Drawing. Filed Mar. 27, 1964, Ser. No. 355,454
Claims priority, application Japan, Mar. 30, 1963, 38/14,251
26 Claims. (Cl. 260—78)

This invention relates to a process for the polymerization of N-carboxy-α-amino acid anhydrides.

It is well known that N-carboxy-amino acid anhydrides, especially N-carboxy-α-amino acid anhydrides in the presence of suitable initiators such as water, alcohols, amines, etc. undergo polymerization with the loss of carbon dioxide to form polypeptides of high molecular weight.

We have already found that N-carboxy amino acid anhydrides are polymerized using as an initiator organometallic compounds such as alkyl metals, metal alkoxides and metal chelates to give high molecular weight polyamino acids (Japanese patent application No. 41,862/1962). In this case it has also been found that, for certain organometallic compounds, the presence of water, alcohol and the like or the presence of a reaction product between water, alcohol and the like show greater ability of initiating polymerization.

The fact that this method of polymerization can be applied not only to the case of optically active acids but also to the case of racemic or optically inactive amino acids leads one to conclude that N-carboxy-amino acid anhydrides are generally equal in their reactivity regardless of their optical activity.

In addition, it has also been found that no isomerization or racemization occurs in the course of this method of polymerization.

Therefore, according to the method of polymerization mentioned above, poly-L-amino acid is obtained from N-carboxy-L-amino acid anhydride, and poly-DL-amino acid (racemic, optically inactive) can be obtained from N-carboxy-DL-(racemic) amino acid anhydride.

We have developed this method further, and have found a new method of stereospecific polymerization comprising obtaining optically active polyamino acids from N-carboxy optically inactive racemic amino acid anhydrides.

The method according to this invention comprises polymerizing N-carboxy-α-amino acid anhydrides containing asymmetric carbon atom in the presence of (I) organic compounds having both asymmetric carbon atoms and an active hydrogen atom (which includes enolizable ketone) and (II) organometallic compounds containing metals of Groups I, II and III of the Periodic Table.

This invention aims, by means of a method of polymerization such as mentioned above, to obtain optically active polyamino acid or polyamino acid whose properties are greatly improved compounds to those of DL-α-amino acid produced according to conventional manufacture, and to manufacture moulded products such as fiber or film having improved properties which cannot be obtained by the formerly known method from these compounds.

According to this method of polymerization, a stereospecific polymerization of N-carboxy-DL-amino acid anhydrides with respect to asymmetric carbon atom is carried out, and consequently optically active polyamino acids can be obtained and besides polyamino acids of improved properties can be obtained.

As for the amino acids which are used in this invention, N-carboxy-α-amino acid anhydrides containing asymmetric carbon atom are all suitable. That is to say, N-carboxy-neutral amino acid anhydrides such as alanine, leucine, nor-valine, isoleucine and α-phenylalanine, ω-esters of N-carboxy-acidic amino acid anhydrides such as aspartic acid and glutamic acid, and N-carboxy-amino acid anhydrides whose amino groups, carboxyl groups, hydroxyl groups or thiol groups are masked such as O-benzyl serine, O-acetyl serine, O-acetyl threonine, ε-acetyl lysine, ε-carbobenzoxy lysine, δ-acetyl ornithine and methionine, can all be utilized. Besides, a mixture of two or more of these compounds can be used according to the purpose.

The catalysts of this invention are selected from the groups as follows: (I) an organometallic compound represented by the following general formula:

$$MR_{n-m}H_m \text{ or } LiAlR_{4-p}H_p$$

(wherein M represents a metal selected from the group consisting of Li, Na, K, Be, Mg, Ca, Zn, Cd, B, Al and Ga. R represents an organic group selected from the group consisting of alkyl, alkenyl, cycloalkyl, cycloalkenyl, aralkyl, alkoxy, cycloalkoxy, arylalkoxy, aryloxy, dialkyl amino, alkylarylamino, alkylthio, cycloalkyl thio, and acyloxy groups; n represents the valency of the metal M which is between 1 and 3; m represents an integer between 0 and 2; and p represents an integer between 0 and 3) or (II) an organometallic compound as defined above in (I) combined with an organic compound having at least one asymmetric carbon atom or (III) an organometallic compound as defined above in (I) and having at least one asymmetric carbon atom.

That is to say, the catalyst in the method of the invention may be (I) an organometallic compound, which is optically active or (II) an organometallic compound which is combined with an organic compound which contains asymmetric carbon atoms or (III) an organometallic compound, which itself contains asymmetric carbon atom per se.

In case it is desired to obtain optically active polyamino acid, it is necessary to employ an optically active substance, but if it is simply desired to obtain polyamino acid with improved properties, optically inactive compound can be utilized so long as it contains asymmetric carbon atoms.

This method is schematically illustrated as follows:

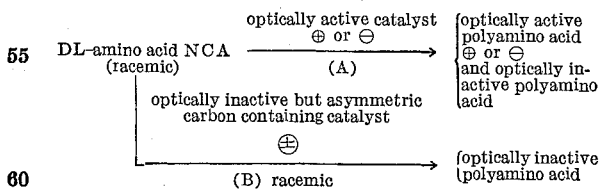

It will be discussed later whether the optically inactive polyamino acid obtained here has a great difference in its properties compared with optically inactive polyamino acid obtained not by this method but by the usual one, and whether the former has improved properties.

The obtaining of optically inactive polyamino acid by means of process (A) means that the total optical rotary power of a nearly 100% polymerized polymer is zero or nearly zero, and other properties are nearly or quite same with those of optically active polyamino acid obtained according to the same process.

Process (B) is more convenient and favorable in which both stereospecific polymerizations of each enantiomorphic isomer occur simultaneously in the process (A).

Optically active organometallic compounds can be obtained by the reaction between metals or organometallic compounds and optically active substances.

As for optically active substances, it is natural that either enantiomorphic isomer can be utilized equally.

The compounds containing asymmetric carbon atom are, as described before, the compounds which have at least some interaction with the organometallic compound (for example sufficient to react, or to form complexes) and preferred to be bulky ones having asymmetric carbon atom as near to the functional group which reacts or interacts with the organometallic compounds as possible.

The preferred organometallic compounds include methyl lithium, ethyllithium, n-propyl lithium, isopropyl lithium, n-butyllithium, sec-butyl lithium, tert-butyl lithium, isobutyl lithium, isoamyl lithium, cyclohexyl lithium, cis-propenyl lithium, isobutenyl lithium, phenyl lithium. O-tolyllithium, O-anisyllithium, p-ethoxyphenyllithium, p-dimethylaminophenyllithium, 2 - thienyllithium, naphthyllithium, pyridyllithium, lithium methoxide, lithium ethoxide, lithium butoxide, n-butyl sodium, amylsodium, sodium methoxide, sodium sec-butoxide, potassium methoxide, potassium butoxide, potassium isopropoxide, potassium cyclohexylate, diethyl beryllium, diisopropyl beryllium, isopropyl beryllium hydride, di-n-butyl beryllium, dimethyl magnesium, diethyl magnesium, diphenyl magnesium, bis(triphenylmethyl)magnesium, magnesium methylate, magnesium phenolate, diethyl calcium, diethyl strontium, dimethyl zinc, diethyl zinc, zinc ethoxide, di-n-propyl zinc, diphenyl zinc, diethyl cadmium, di-n-butyl cadmium, trimethyl boron, triethyl boron, tri-n-butyl boron, dimethyl vinyl boron, triphenyl boron, trimethyl aluminum, triethyl aluminum, tri-n-proyl alumium, triisopropyl aluminum, triphenyl aluminum, dimethyl aluminum hydride, diethyl aluminum hydride, aluminum trimethoxide, aluminum triethoxide, aluminum triisopropoxide, dimethyl aluminum dimethylamide, dimethyl aluminum methoxide, dimethyl aluminum methyl mercaptide, lithium tetraphenyl aluminum, lithium aluminum tetramethoxide, triethyl gallium, triphenyl gallium, dimethyl gallium amide and dimethyl gallium methoxide.

The preferred organic compounds having asymmetric crabon atom which are used with the organometallic compounds include sec-butyl alcohol, active amyl alcohols, methyl vinyl carbinol, ethylethyleneglycol, 1,2 - pentanediol, α-phenyl ethyl alcohol, α-methyl-α-phenyl-butyl-alcohol, menthol, borneol, linalol, methylethylketone, phenyl benzyl alcohol, α-methyl cyclohexanol, p-methyl benzyl ketone, sec-butylether, α-methyl cyclohexanone, diisoamylether, menthol methyl ether, borneolethylether, α-methyl propionaldehyde, α-methyl-butyraldehyde, β-hydroxy butyralaldehyde, acetaacetic aldehyde, lactic acid, pantoic acid, oxy-glutaric acid, methyl succinic acid, tartaric acid, methyl ethyl acetic acid, menthylacetoacetate, ethyl lactate, methyl lactate, lactide, diethyl tartarate, pantolactone, menthyl salicylate, mandelic acid, mandelic acid esters, bornyl acetoacetate, dimenthyl malonate, menthyl cyanoacetate, cinchonine, cinchonidine, camphor, nicotine, alanine, phenyl alanine, aspartic acid phenyl alanine ether ester, N-acetylthreonine, menthyl cyanoacetate, cyanohydrine, mandelonitrile, propyleneoxide, amylene oxide, glycidol, 2,3 - epoxypentane, 2,3 - epoxybutane, sec-butylmercaptan, actine amyl mercaptan, sec-butylamine, 2-methylbutylamine and disec-butylamine.

Organometallic compounds having asymmetric carbon atom are prepared by reacting the above-described organometallic compounds or metals of Groups I, II and III of the Periodic Table with the above-described organic compounds having asymmetric carbon atom. Examples of the organometallic compounds having asymmetric carbon atom are active amyl lithium, di-active-amylzinc, tri-activeamyl aluminum, sec-butyl lithium, di-sec-butyl zinc, lithium-sec-butylate, aluminum-tri-sec-butylate, aluminum-tri-(2 - methylbutyl), aluminum monoethyl dimenthylate, zinc monoethyl-α-phenylethylate lithium - α - phenylethyl, zinc-di - α - phenylethyl, dimethyl aluminum-sec-butylmercaptide, dimethyl aluminum-activeamyl mercaptide, dimethyl aluminum(di-sec-butyl) amide, aluminum tri-menthylate, lithium-α-phenylethylate, sec-butylborate, zinc-di-bornylate.

The method according to this invention is carried out by nearly the same technique as the usual method of polymerization of N-carboxyaminoacid anhydrides. The polymerization is carried out in a solvent. There are no limitations on the solvents used, and any liquid that does not interfere with the polymerization by reacting with N-carboxyaminoacid anhydrides or organometallic compounds can be used, therefore ethers, ketones, esters, nitriles, amides, sulfoxides, hydrocarbons and halogenated hydrocarbons can be utilized, and for example it is especially convenient to use one or a mixture of more than two of dioxane, tetrahydrofurane, methylethylketone, ethyl acetate, acetonitrile, N,N-dimethyl formamide, dimethylsulfoxide, benzene, toluene, chloroform, dichloroethane, tetrachloroethane, etc.

In addition, optically active or racemic compounds mentioned above are used as the solvent separately or mixed with the solvents above mentioned, and this is considerably effective in some cases.

As described before, when N-carboxy-DL-amino acid anhydride is polymerized by means of an optically active organometallic compound or a combination of organometallic compound and optically active organic compound stereospecific polymerization is carried out and consequently optically active polyamino acid can be obtained. But in this case, for example, dextro-polyamino acid is not necessarily obtained from dextro-compound because whether the polymer is dextrorotatory ($[\alpha]_D > 0$) or levorotatory ($[\alpha]_D < 0$) is changed by the optical rotation of the optically compound used and the solvent used for the measurements.

Besides, though it is very natural, the total optical rotary power will be zero or very close to zero when the polymerization is effected completely and the entire quantity of N-carboxy-DL-amino acid anhydride is converted into polyamino acid.

When the polymerization is carried out using racemic compounds, the obtained polyamino acid exhibits no optical rotatory power. But the fact that the polymerization is essentially the same as the one carried out using corresponding optically active compounds will be understood from the fact that the obtained polymer is completely identical with that obtained by complete polymerization by means of an optically active initiator except in optical properties and is different from a polymer obtained by means of a usually known compound which dies not contain an asymmetric carbon atom, for example tri-n-butylamine.

The known methods of polymerization of N-carboxy amino acid anhydrides, can be applied as for the processes of polymerization itself, and the amount of optically active or inactive organometallic compound is, based on that of N-carboxy amino acid anhydride to be polymerized, within a range between 0.001~10 (mole) percent, and is usually between 0.01~5 (mole) percent. In the case in which optically active or racemic compounds are employed together, there are no limitations on the amount of these organic compounds, but it is preferable, to use more than 0.3 mole based on the amount of organometallic compound employed.

Generally speaking, the polymerization is carried out under reduced pressure or atmospheric pressure or an augmented pressure in an inert gas atmosphere and, as for the temperature of polymerization, though there are no special limitations, it is carried out in a range between −20° C. and 150° C., usually at 0°∼60° C.

The properties of the polyamino acid obtained by the execution of the method of this invention will be further explained.

In carrying out this invention, N-carboxy-DL-amino acid anhydride causes asymmetric-selective polymerization, in an ideal case according to the following formula, and forms a mixture of d-d-sequence rich polyamino acid and l-l-sequence rich acid respectively:

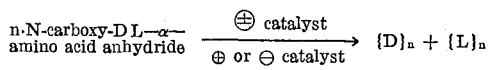

In addition, as the absorption band at 1270 cm.$^{-1}$ in the IR spectra of polyalanine is attributed to its α-helix structure, the characteristics of this method can be found in the variation of this band.

That is to say, for poly-DL-alanine obtained using n-Bu$_3$N, an absorption band at 1240 cm.$^{-1}$ which is assigned to the random coil structure can be found, but α-helix absorption band resulting from stereoregularity cannot be found. On the other hand by the method according to this invention, an absorption at 1270 cm.$^{-1}$ can be recognized as in the case of poly-L-alanine.

Besides, the solubility of polyamino acid in some solvents is said to reflect the regularity in structure. For example, poly-DL-alanine obtained by the usual methods dissolves or swells in water, and dissolves in formic acid. On the other hand, poly-L-alanine or poly-D-alanine are insoluble in water and also in formic acid, and polyalanine obtained from N-carboxy-DL-alanine anhydride by the method according to this invention is insoluble in formic acid.

These facts can be also recognized in the cases of other amino acids such as polyaspartate, polyglutamate etc., and verified for many optically active catalyst systems or asymmetric carbon containing catalyst systems.

In the preceding formula:

⊕ catalyst: racemic catalyst
⊕ or ⊖ catalyst: levorotary or dextrorotary (optically active) catalyst
{—L—}$_n$, {—D—}$_n$: d and l amino acid residue In the case of obtaining an optically active polyamino acid from a racemic amino acid using an optically active catalyst, the processes and results will be readily understood from the examples described later. If the polymerization is not carried out completely but interrupted along the way, either one enantiomorphic isomer acquires priority of the amino acid entering the polymer first on account of the stereoselectivity (specificity) of the catalyst system, and therefore a polymer consisting of either enantiomorphic isomer is obtained. But in fact, a complete stereospecific polymerization can hardly be said to occur, and the obtained polymers, judging from their solubilities, are hardly seen to be genuine poly-L-amino acid or poly-D-amino acid. Presumably in a chain there will be statistical contaminations by the enantiomorphic isomer of the other type, the total sum of asymmetric carbon atoms in the polymer and the existence of helix of polymer etc. is observed as the optical rotatory power, and as a result optically active polyamino acid can be obtained from racemic amino acid. But the difference between "D" and "L" in the total product decreases with the development of polymerization, and at least no optical activity is shown in a completely polymerized system. Nevertheless it goes without saying that this polymer is essentially different from random polyamino acid.

In the case of an optically inactive but asymmetric carbon containing catalyst, simultaneous selective asymmetric polymerization occurs by means of both enantiomorphic isomers of optically active catalyst. In this case it is natural that the rotatory power of the polymer cannot be detected, but in the X-ray diffraction pattern and IR spectra of the obtained polymer and in the properties of fibers obtained from this polymer a distinct difference can be recognized.

That is to say, for example poly-L-alanine shows a clear diffraction pattern at 2θ=11.5°, but poly-DL-alanine polymerized by tri-n-butyl amine scarcely shows a detectable pattern at 2θ=11.5°. In a case of poly-DL-alanine obtained by the method according to this invention (Example 1 (B and C) a clear pattern can be observed at 2θ=11.5°.

The method according to this invention has been so far explained with respect to racemic, that is to say, optically inactive amino acids, but this method can also be applied in a similar manner to partly resoluted amino acids which shows optical activity, and satisfactory results can be obtained.

Polyamino acid polymerized from N-carboxy-DL-amino acid according to the method described above also shows characteristics in physical properties on account of the difference in the content of stereosequence compared with polyamino acid obtained by the already known method. Fibers made from polyamino acid obtained by this method exhibit superiority in tensile strength, durability against chemicals and heat compared with that made from random polyamino acid manufactured by the usual methods.

*Example 1*

2.0 g. of DL-alanine N-carboxy anhydride are dissolved in 50 cc of a mixture of anhydrous benzene and dioxane (4:1 in vol.), and is polymerized for 48 hours at 15° C. in a nitrogen-substituted glass ampoule. The obtained product is treated with ether, extracted with hot methanol, and then dried under a reduced pressure. The results are shown in Table 1.

| No. | Catalyst system | Conc. (Initiator/monomer in mole) |
|---|---|---|
| 1-A | Tri-n-butyl amine | 1/50 |
| 1-B | Aluminum-ethyl di-l-menthylate [a] | 1/50 |
| 1-C | Aluminum triethyl [b] | 1/50 |
|  | Menthol (−) | 2/50 |
| 1-D | Aluminum triethyl | 1/50 |

[a] Obtained by reacting aluminum triethyl and menthol (−) in benzene.
[b] Both catalysts are dissolved in benzene and added to the N-carboxy anhydride solution simultaneously.

TABLE 1

| No. | Polymer yield (percent) | Reduced viscosity of polymer [a] | IR spectra (cm.$^{-1}$) | Solubility in formic acid | $[\alpha]_D^{25}$ |
|---|---|---|---|---|---|
| 1-A | 80 | 0.52 (0.56) | 1,240 | Soluble | None |
| 1-B | 25 | 0.30 (0.58) | 1,270 | Insoluble | −2.0 |
| 1-C | 28 | 0.42 | 1,272 | do | −2.2 |
| 1-D | 32 | 0.32 | 1,240 | Swelling | None |

[a] Reduced viscosity shows the results of measurements at 25° C. using the concentration 1.0 g./100 cc. of dichloroacetic acid; the values in ( ) are the results obtained in trifluoroacetic acid at the same concentration. $[\alpha]_D^{25}$ is measured in dichloroacetic acid at 25° C.

*Examples 2–5*

DL-alanine N-carboxy anhydride is polymerized in a similar manner as in Example 1. The results are shown in the following Table 2.

TABLE 2

| No. | Solvent | Initiator | Initiator/monomer in mole | Yield (percent) | $\eta_{sp/c}$ | IR spectra (cm.$^{-1}$) | $[\alpha]S_D^{25}$ | Solubility in formic acid |
|---|---|---|---|---|---|---|---|---|
| 2 | Benzene | (±) C$_6$H$_5$—CH(OLi)—CH$_3$ (i) | 1/50 | 96 | 0.81 | 1,270 / 1,240 | | Insoluble. |
| 3 | Benzene | ZnEt$_2$ / C$_6$H$_5$—CH$_2$—CO—C$_6$H$_5$ (ii) | 1/50 / 2/50 | 72 | 0.53 | 1,270 / 1,240 | | Insoluble. |
| 4 | Dioxane | AlEt$_3$ / DL C$_6$H$_5$—CH(N(CH$_3$)$_2$)—CH$_3$ (iii) | 1/50 / 2/50 | 92 | 0.90 | 1,270 | | Insoluble. |
| 5 | Dioxane | AlEt$_3$ / DL CH$_3$COCH$_2$·COO—CH(CH$_3$)—C$_2$H$_5$ (iv) | 1/50 / 2/50 | 67 | 0.40 | 1,268 | | Insoluble. |

(i) Lithium-α-phenylethylate.  (ii) Phenylbenzylketone.  (iii) N-dimethyl-α-phenylethylamine.  (iv) Sec-butylacetoacetate.
Polymerization temperature, 30° C.; Monomer concentration, 5 wt. percent; Polymerization period 24 hrs.

*Examples 6–17*

2.0 g. of γ-methyl-DL-glutamate N-carboxyanhydride are polymerized under the following conditions, and the results can be seen in the following table.

through a nozzle, there is obtained white and fragile fibrous substance. This material cannot be stretched and it is impossible to obtain a strong fiber. The viscosity of the solution of this polymer is 1.01.

| No. | Initiator | Initiator concn. | Solvent | Yield (percent) | Reduced viscosity | Solubility in dichloroethane | I.R. spectra (cm.$^{-1}$) | $[\alpha]_D^{25}$ |
|---|---|---|---|---|---|---|---|---|
| 6 | DL C$_6$H$_5$—CH(OLi)—CH$_3$ | 1/70 | Chloroform | 81 | 1.23 | Hardly soluble | 620 | |
| 7 | n-BuLi | 1/50 | do | 95 | 0.67 | Soluble | 650 | |
| 8 | n-BuLi / C$_6$H$_5$—CH$_2$—CO—C$_6$H$_5$ | 1/50 / 2/50 | do | 72 | 1.08 | Hardly soluble | 620 / 650 | |
| 9 | Zn-di-D-bornylate | 1/50 | Dioxane | 91 | 0.92 | Swelling | 620 / 650 | +0.2 |
| 10 | Tri-n-butylamine | 1/50 | Chloroform | 92 | 1.31 | Soluble | 650 | |
| 11 | Al(C$_2$H$_5$)$_2$H / Menthol | 1/50 / 2/50 | do | 85 | 1.25 | Swelling | 620 | |
| 12 | Al(C$_2$H$_5$)$_2$H / α-Phenylethylalcohol | 1/50 / 2/50 | do | 82 | 1.31 | do | 620 / 650 | |
| 13 | Al(C$_2$H$_5$)$_2$(OCH$_3$) / α-Phenylethylalcohol | 1/50 / 2/50 | do | 90 | 1.20 | do | 620 / 650 | |
| 14 | Dimethylaluminummethylmercaptide / α-Phenylethylalcohol | 1/50 / 2/50 | do | 85 | 1.09 | do | 620 / 650 | |
| 15 | Dimethylaluminumdimethylamide / α-Phenylethylalcohol | 1/50 / 2/50 | do | 87 | 1.10 | do | 620 / 650 | |
| 16 | Lithium aluminum hydride / Sec-butylalcohol | 1/50 / 2/50 | do | 86 | 0.90 | do | 620 / 650 | |
| 17 | Sec-butylborate | 2/50 | do | 62 | 0.70 | do | 620 | |

Polymerization temperature, 35° C.; Polymerization time, 20 hrs.; Monomer concentration, 5 wt. percent.

*Example for reference.*—Poly-γ-methyl-L-glutamate obtained from γ-methyl-L-glutamate N-carboxy anhydride using tri-n-butylamine as initiator is insoluble in dichloroethane and shows a strong absorption band at 620 cm.$^{-1}$ (attributed to α-helix structure).

*Example 18*

20 g. of γ-methyl-DL-glutamate N-carboxy anhydride are dissolved in a mixture of 150 of methylene chloride and 50 g. of dioxane and the resultant solution is divided into two parts.

*Experimental (A).*—One part of the solution is added with 0.2 g. of tri-n-butyl amine and is polymerized at 25° C. for 24 hours, and the transparent solution is spun into a mixture of acetone and methanol (1:1 vol.)

*Experiment (B).*—The other part of solution is added with 0.1 g. of aluminum triethyl and 10 g. of D-camphor, and polymerized at 25° C. for 24 hours. The product is spun through a nozzle into a mixture of acetone and methanol (1:1 vol.). This fiber can be stretched in a water bath and is stretched 150%, and there is obtained a fiber which is insoluble in carbon tetrachloride and O-dichloro benzene. This filament exhibits a tenacity of 1.2 g./denier and an elongation of 22% and shows orientation.

*Examples 19–23*

Similar experiments are carried out using β-methyl-DL-aspartate N-carboxy anhydride and the following results are obtained.

| No. | Initiator | Initiator/ nomomer in mole | Solvent | Yield (percent) | $[\alpha]_D$ | M.P. | Solubility |
|---|---|---|---|---|---|---|---|
| 13 | n-Bu₃N | 1/80 | Dioxane, 1; chloroform, 6. | 72 | | 181–182 | Soluble in chloroform. |
| 14 | {AlEt₃ / l-Nihotine} | 1/50 2/50 | ----do---- | 42 | −10.5 | 279 | Slightly soluble in chloroform. |
| 15 | {ZnEt₂ / DL-methyl aspartate} | 1/50 2/50 | ----do---- | 62 | | 260 | Do. |
| 16 | Aluminum-tri-active-amylate | 1/50 | ----do---- | 50 | | 200 | Do. |

Polymerization temperature, 50° C.; polymerization time, 48 hrs.; monomer concentration, 5 wt. percent.

Example 24

5.0 g. of DL-β-phenylalanine N-carboxy anhydride dissolved in 20 ml. of dioxane are added with 0.05 g. of aluminum triethyl and DL-N,N-dimethyl β-phenylalanyl-N,N-dimethylamide, mixed, and then polymerized at 30° C. for 24 hours, and subsequently treated with diethyl-ether, acidic methanol hydrochloric acid, and then methanol. There is obtained poly-DL-phenylalanine which is insoluble in dioxane. Poly-DL-β-phenylalanine similarly produced using n-butyl amine as initiator is soluble in dioxane, but on the other hand poly-L-phenylalanine produced from L-phenylalanine N-carboxy anhydride is insoluble.

Examples 25–28

5 g. of DL-methionine N-carboxy anhydride are dissolved in 20 ml. of dioxane and polymerized using the following initiator at 35° C. for 40 hours. Polymethionine thus obtained is dissolved in m-cresol and cast to be a film by evaporation. The film exhibits a higher tensile strength than the film obtained by using as initiator tri-n-butyl amine. The results are shown in the following table.

| No. | Initiator | Yield (percent) | $\eta_{sp/c}$ | Tensile strength, kg./mm.² | Elongation (percent) |
|---|---|---|---|---|---|
| 25 | {Al(C₂H₅)₃, 0.1 g / Camphor, 2.1 g} | 64 | 0.60 | 22 | 30 |
| 26 | {Al(C₂H₅)₃, 0.1 g / Menthol (+), 2.0 g} | 62 | 0.52 | 20 | 32 |
| 27 | {Al(C₂H₅)₃, 0.1 g / Sec-butanol, 2.0 g} | 42 | 0.45 | 17 | 35 |
| 28 | Tri-n-butyl-amine, 0.1 g | 90 | 0.62 | 12 | 10 |

What is claimed is:

1. A process for producing poly-DL-amino acids capable of forming fiber, film and fabricated articles, which process comprises polymerizing N-carboxy-DL-α-amino acid anhydride in an inert organic solvent, in the presence of a catalyst selected from the group consisting of: combinations of a compound selected from the group consisting of organometallic compounds having the following general formulas: $MR_{n-m}H_m$ and $LiAlR_{4-p}H_p$ wherein M represents a metal selected from the group consisting of Li, Na, K, Be, Ca, Sr, Ba, Zn, Cd, B, Al and Ga; R represents a radical selected from the group consisting of alkyl, alkenyl, cycloalkyl, cycloalkenyl, aralkyl, alkoxy, cycloalkoxy, arylalkoxy, aryloxy, dialkylamino, alkylarylamino, alkylthio, cycloalkylthio and acyloxy groups; n represents the valency of the metal, which is between 1 and 3, m represents an integer from 0 to 2, and p represents an integer from 0 to 3, and an organic compound having at least one asymmetric carbon atom; and organometallic compounds which have the general formulas: $MR_{n-m}H_m$ and $LiAlR_{4-p}H_p$ as defined above and which has at least one asymmetric carbon atom.

2. Poly-DL-alanine prepared from N-carboxy-DL-alanine anhydride by the process of claim 1 which is water-insoluble, formic acid-insoluble and has an optical rotation value, said optical rotation value being between that of poly-D-alanine and that of poly-L-alanine; the poly-DL-alanine having an X-ray diffraction pattern at $2\theta=11.5°$, and an infra-red absorption band at 1270 cm.$^{-1}$.

3. A process according to claim 1, wherein the N-carboxy-DL-α-amino acid is selected from the group consisting of DL-alanine N-carboxy anhydride, γ-methyl-DL-glutamate N-carboxy anhydride, β - methyl - DL-aspartate N-carboxy anhydride, DL-β-phenyl alanine N-carboxy anhydride and DL-methionine N-carboxy anhydride.

4. A process according to claim 1, wherein the organic compound having at least one asymmetric carbon atom has at least one active hydrogen atom.

5. A process according to claim 1, wherein the organic compound having at least one asymmetric carbon atom has at least one enolizable hydrogen atom.

6. A process according to claim 1, wherein the organic compound having at least one asymmetric carbon atom has at least one active hydrogen atom and at least one enolizable hydrogen atom.

7. A process according to claim 1, wherein the organic compound having at least one asymmetric carbon atom is an optically active compound.

8. A process according to claim 1, wherein the organic compound having at least one asymmetric carbon atom is an optically inactive compound.

9. A process according to claim 1, wherein the organic compound having at least one asymmetric carbon atom is employed in amount of at least 0.3 mole percent based on the other of the organometallic compounds and the latter organometallic compounds being employed in an amount of 0.0001–10 (mole) percent based on the N-carboxy amino acid anhydride.

10. A process according to claim 1, wherein the polymerization is carried out at a temperature between −20° C. and 150° C.

11. A process according to claim 1, wherein the organic compound having at least one asymmetric carbon atom is aluminum-ethyl-di-l-menthylate.

12. A process according to claim 1, wherein the organometallic compound having at least one asymmetric carbon atom is lithium-α-phenylethylate.

13. A process according to claim 1, wherein the organometallic compound having at least one asymmetric carbon atom is zinc-di-D-bornylate.

14. A process according to claim 1, wherein the organometallic compound having at least one asymmetric carbon atom is aluminum tri-active-amylate.

15. A process according to claim 1, wherein the first mentioned organometallic compound is aluminum triethyl.

16. A process according to claim 1, wherein the first mentioned organometallic compound is n-butyl lithium.

17. A process according to claim 1, wherein the first mentioned organometallic compound is zinc diethyl.

18. A process according to claim 1, wherein the first mentioned organometallic compound is lithium aluminum hydride.

19. A process according to claim 1, wherein the said organic compound is selected from the group consisting of organic alcohol, ketone, ether, aldehyde, carboxylic acid, amino acid, carboxylic acid ester, amino acid ester, mercaptide and amine.

20. A process according to claim 1, wherein the said organic compound is borneol.

21. A process according to claim 1, wherein the said organic compound is menthol.

22. A process according to claim 1, wherein the said organic compound is phenylbenzylketone.

23. A process according to claim 1, wherein the said organic compound is N-dimethyl-α-phenylethylamine.

24. A process according to claim 1, wherein the polymerization is carried out in the presence of a catalyst consisting of $Al(C_2H_5)_3$ and N-dimethyl-α-phenylethylamine.

25. A process according to claim 1, wherein the polymerization is carried out in the presence of a catalyst consisting of n-butyl lithium and phenylbenzylketone.

26. A process according to claim 1, wherein the polymerization is carried out in the presence of a catalyst consisting of $Al(C_2H_5)_3$ and borneol.

References Cited
UNITED STATES PATENTS 2,789,973    4/1957    MacDonald _____ 260—78
3,089,749    5/1963    Balland _____ 260—78 XR Blout et al., J. Am. Chem. Soc. 78, 941 (1956) (6 pp.).
Idelson et al., J. Am. Chem. Soc. 80, 2387 (1958) (7 pp.).
Bamford et al., Synthetic Polypeptides, 1956, Academic Press, Inc., New York, pp. 161, 286, 287, 289, and 333.

WILLIAM H. SHORT, *Primary Examiner.*

LEON J. BERCOVITZ, SAMUEL H. BLECH,
*Examiners.*

H. D. ANDERSON, M. J. WELSH, *Assistant Examiners.*